(12) United States Patent
Av et al.

(10) Patent No.: US 12,455,792 B2
(45) Date of Patent: Oct. 28, 2025

(54) SMART PRIORITIZATION OF CONTAINERS FOR DATA PROTECTION USING SUPERVISED LEARNING

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 18/352,256

(22) Filed: Jul. 14, 2023

(65) Prior Publication Data

US 2025/0021440 A1    Jan. 16, 2025

(51) Int. Cl.
  *G06F 16/20*  (2019.01)
  *G06F 11/14*  (2006.01)
  *G06F 16/215*  (2019.01)
  *G06N 20/00*  (2019.01)

(52) U.S. Cl.
  CPC ........ *G06F 11/1461* (2013.01); *G06F 16/215* (2019.01); *G06N 20/00* (2019.01); *G06F 2201/84* (2013.01)

(58) Field of Classification Search
  CPC .... G06F 11/1461; G06F 16/215; G06F 20/00; G06F 2201/84
  See application file for complete search history.

(56) References Cited

U.S. PATENT DOCUMENTS

| | | | |
|---|---|---|---|
| 11,709,738 B1* | 7/2023 | Sampath | G06F 11/1464 711/162 |
| 2019/0179712 A1* | 6/2019 | Snyder | G06F 11/1464 |
| 2020/0228602 A1* | 7/2020 | Spoczynski | G06F 9/5005 |
| 2021/0240774 A1* | 8/2021 | Bikumala | H04L 41/16 |
| 2021/0303416 A1* | 9/2021 | Brenner | G06F 3/0643 |
| 2022/0014963 A1* | 1/2022 | Yeh | G06N 3/045 |
| 2022/0051043 A1* | 2/2022 | Lee | G06V 10/817 |
| 2022/0124543 A1* | 4/2022 | Orhan | G06N 3/006 |
| 2022/0188167 A1* | 6/2022 | Iyer | G06F 9/45558 |
| 2022/0188700 A1* | 6/2022 | Khavronin | G06Q 30/0201 |
| 2022/0319639 A1* | 10/2022 | Kia | G06N 3/045 |
| 2022/0391639 A1* | 12/2022 | Gurumurthy | G06F 18/23 |
| 2023/0061998 A1* | 3/2023 | Yang | G06N 3/08 |
| 2023/0069310 A1* | 3/2023 | Myronenko | G06T 7/11 |
| 2023/0112004 A1* | 4/2023 | Hari | G06F 11/3457 701/23 |

FOREIGN PATENT DOCUMENTS

WO   WO2022216753        * 10/2022
WO   WO2022216753 A1  * 10/2022

* cited by examiner

*Primary Examiner* — Daniel A Kuddus
(74) *Attorney, Agent, or Firm* — Staniford Tomita LLP

(57) ABSTRACT

A container prioritization process helps schedule backups of containerized data based on defined attributes and historical data. Containers are classified using a KNN-based classifier based on attributes. A tagger component assigns a priority tag to each container. Containers are backed up by a backup server through a schedule based on the priority tags of the containers. New containers are automatically classified and tagged within the prioritization schedule using the KNN-based classifier.

20 Claims, 7 Drawing Sheets

SMART PRIORITIZATION OF CONTAINERS FOR DATA PROTECTION USING SUPERVISED LEARNING

TECHNICAL FIELD

Embodiments are generally directed to containerized data, and more specifically to smart prioritization for Kubernetes backups in a data protection system using supervised learning.

BACKGROUND

Containerization technology has been developed as a lightweight alternative to full machine virtualization that involves encapsulating an application in a container with its own operating environment. This provides many of the benefits of loading an application onto a virtual machine (VM), as the application can be run on any suitable physical machine without any concern about dependencies. Containerization has gained recent prominence with the open-source Docker, in which containers are deployed as portable, self-sufficient containers that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

The Kubernetes system is a popular container management platform for managing containerized applications in a clustered environment and provide ways of managing related, distributed components across varied infrastructures. Database applications on Kubernetes clusters come in a wide range of configurations and ranges, such as from standalone deployment to single partition cluster to multiple partition clusters.

Kubernetes workload protection systems generally emphasize enterprise-level deployments. With ever increasing amounts of data and scalability, however, it becomes very important to have a solution that can ensure a high confidence of the stake holders in any golden copy of their data (e.g., on a container's golden copy). Although some products exist for providing backup solutions, none of them guarantee a prioritized backup and load balancing for the most critical container in case of any disaster situation in a data center. Present systems rely on manual backup of containers based on defined backup policies. Smart prioritization of containers for backups and restores is generally missing, and the maintenance of container backups is typically a purely administrative job of deciding the priority of operations based on container (Docker) parameters. Such a shortcoming is especially problematic in very large-scale (e.g., metropolitan-scale) data environments.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a container prioritization process that helps schedule backups of containerized data based on defined attributes and historical data. Containers are classified using a KNN-based classifier based on attributes. A tagger component assigns a priority tag to each container. Containers are backed up by a backup server through a schedule based on the priority tags of the containers. New containers are automatically classified and tagged within the prioritization schedule using the KNN-based classifier.

Embodiments are further directed to a system and method of prioritizing backups of container data in a network, by classifying, with respect to a backup priority, each container of a plurality of containers storing the container data, and based on attributes of each container; generating a priority score for each container based on the classifying; tagging each container with a priority tag based on the generated priority score; and backing up the container data in a backup order of the plurality of containers as determined by the priority tag of each container.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
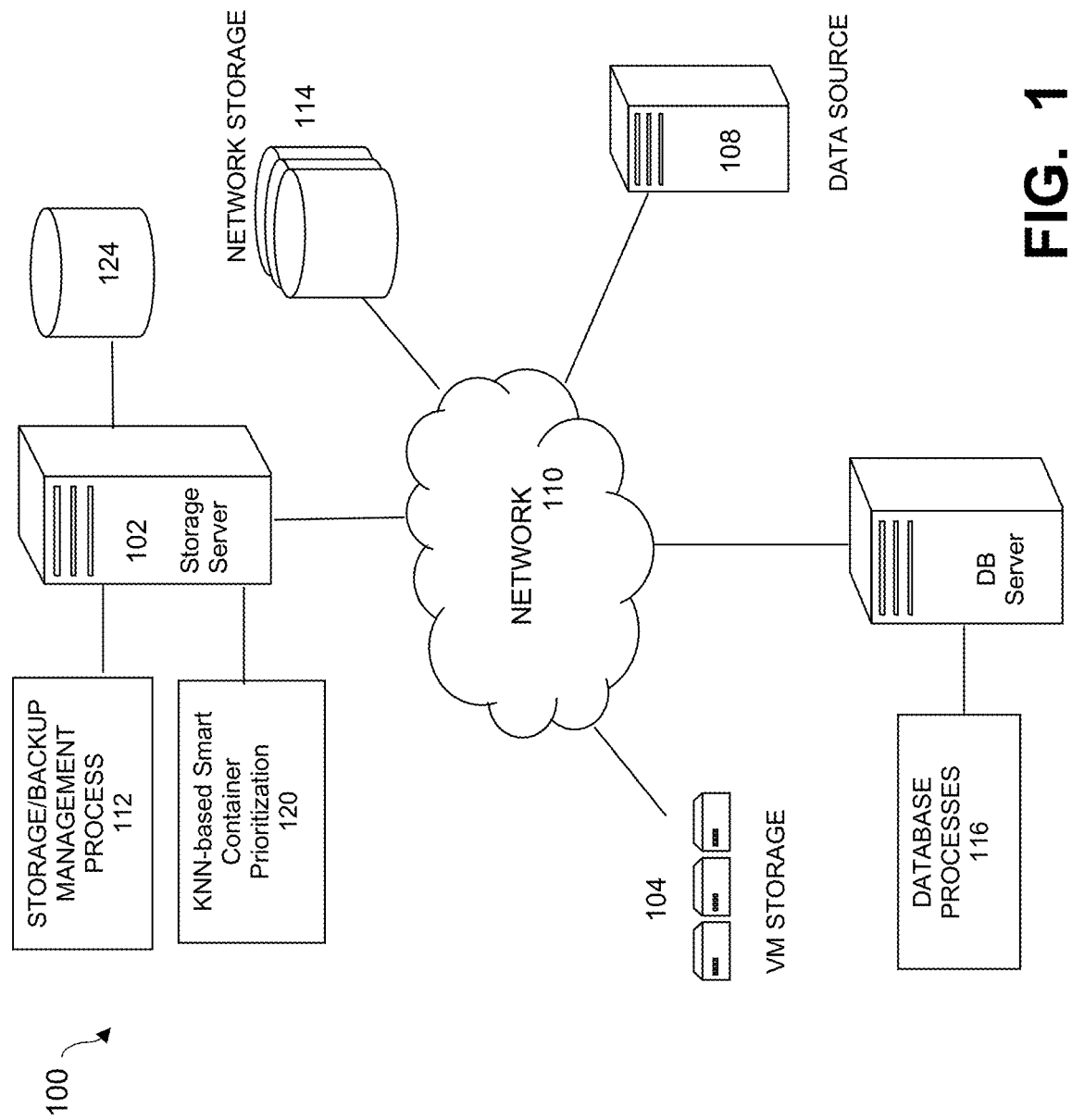
FIG. 1 illustrates a computer network system that implements one or more embodiments of a backup system using supervised learning to implement smart prioritization of containerized data for data protection.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Containerization technology has been developed to facilitate that scaling and deployment of applications and data across distributed and disparate networks. In a containerized system, a number of applications are encapsulated in respective containers, so that each application operates within its own operating environment. The containers are deployed as portable, self-sufficient data structures that can run any practical hardware platform from VMs, cloud clusters, servers, and so on. The multiple isolated containers are run on a single control host and access a single kernel that provides access to certain features such as cgroups (control groups), namespaces, security enhancements (e.g., SELinux), and so on. A container management layer is used to automate the creation, destruction, deployment and scaling of the containers. The well-known Docker container format has been developed to abstract the lower layer of container technology, though other similar formats may also be used. With large scale-data networks as the number and scale of the containers increases, replication of container data is critical for disaster recovery and data restoration. Additionally, orchestration tasks are required, such as service discovery, load balancing, health checks, auto-scaling, zero-downtime deploys, and so on.

FIG. 1 illustrates a computer network system that implements one or more embodiments of a backup system using supervised learning to implement smart prioritization for containerized data with respect to performing data protection tasks.

In system 100 of FIG. 1, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets.

The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Embodiments of FIG. 1 implement certain containerization technology using Docker. As stated previously, containerization involves encapsulating an application in a container with its own operating environment and has been developed as a lightweight alternative to full machine virtualization. Using Docker, containers are deployed as portable, self-sufficient containers that can run on everything from physical computers to virtual machines (VMs), bare-metal servers, cloud clusters, etc. Application containerization is an OS-level virtualization method for deploying and running distributed applications without launching an entire VM for each application. Instead, multiple isolated systems are run on a single control host and access a single kernel. The application containers hold the components such as files, environment variables and libraries necessary to run the desired software. The Kubernetes system is a popular container management platform for managing containerized applications in a clustered environment.

Figure 2:
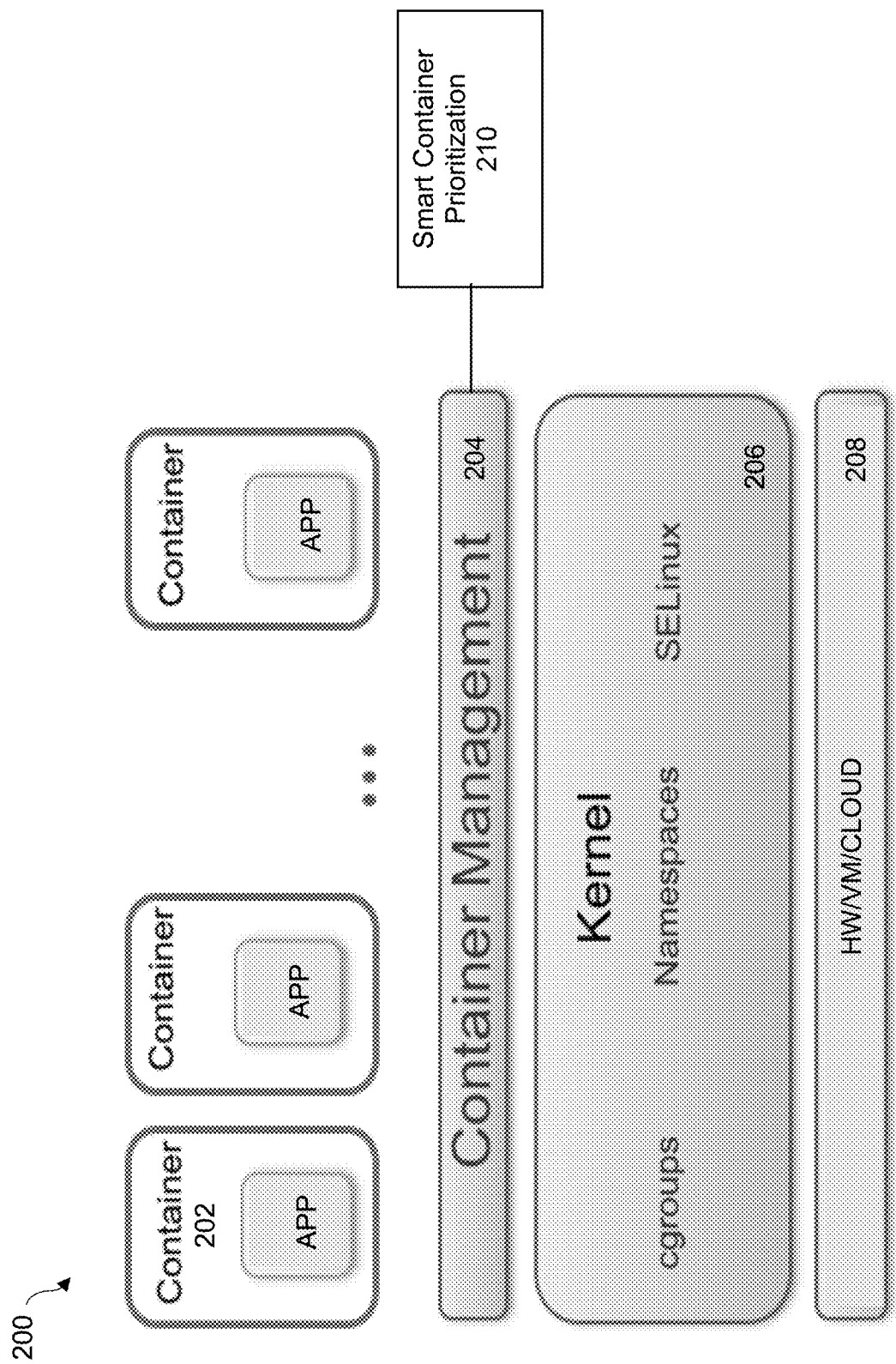
FIG. 2 illustrates a container management system that includes a smart prioritization balancer for containerized data using supervised learning, under some embodiments.

FIG. 2 illustrates a container management system that includes a smart prioritization balancer 210 for containerized data using supervised learning, under some embodiments. As shown in FIG. 2, system 200, a number of applications (apps) are encapsulated in respective containers 202 so that each application operates within its own operating environment. The containers are deployed as portable, self-sufficient data structures that can run any practical hardware platform 208 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 200 utilizes the Docker container format to abstract the lower layer of container technology, though other formats may also be used. An application can run in multiple containers, and usually a container will just run a single micro service.

The container management layer 204 is used to automate the creation, destruction, deployment and scaling of the containers 202. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration.

Such disaster recovery and data restore applications typically involve a data backup system for backing up database data. One example is a Dell PowerProtect data management system that is a software defined data protection system including automated discovery, data deduplication, self-service and IT governance for physical, virtual and cloud environments. For this embodiment, system 200 may include a data management controller 210 coupled to or provided as part of the container management process 204. Although embodiments are described with respect to PowerProtect data management systems, and other related systems, such as Data Domain, it should be noted that embodiments are not so limited, and other similar platforms may also be used. To support certain container prioritization processes, a container prioritization component 210 is coupled to or provided as part of the container management process 104 or a data management controller function of the container management process.

In an embodiment, the container management layer 204 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster. In general. Kubernetes is an open-source container-orchestration system for automating application deployment, scaling, and management of containerized applications, and a Kubernetes cluster can run in the public cloud or on-premises and is designed to scale services on-demand.

Figure 3:
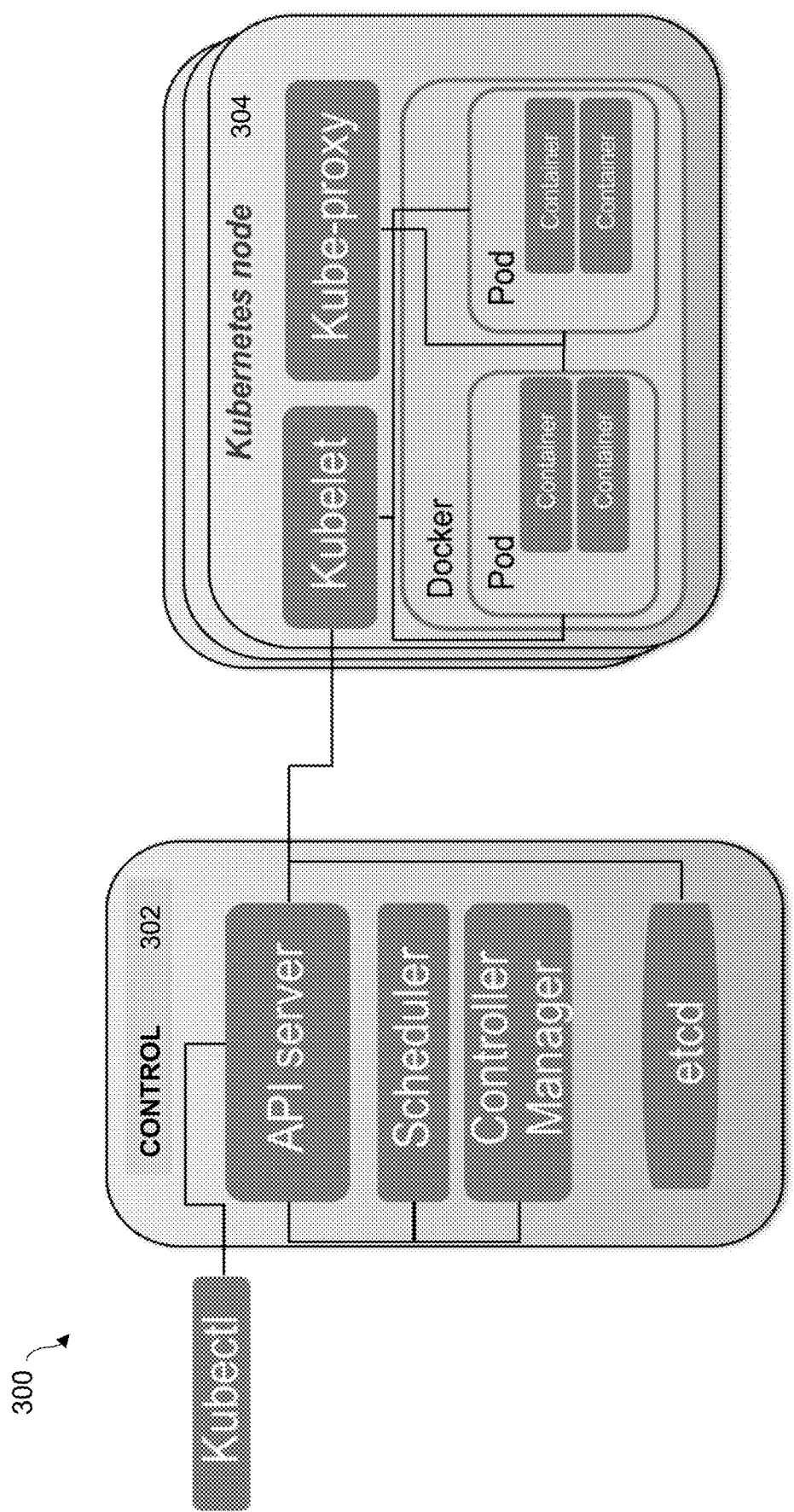
FIG. 3 is a block diagram that illustrates the architecture of a Kubernetes platform implementing a smart prioritization balancer, under some embodiments.

FIG. 3 is a block diagram 300 that illustrates the architecture of a Kubernetes platform implementing a container prioritization process, under some embodiments. The controlling services in a Kubernetes cluster are called the control plane 302 components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

Within the control plane 302 is an API server that allows a user to configure many of Kubernetes' workloads and organizational units. It also is responsible for making sure that the etcd store (which stores configuration data to be used by the nodes) and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, and so on.

The scheduler assigns workloads to specific nodes in the cluster. This is used to read in a service's operating requirements, analyze the current infrastructure environment, and place the work on an acceptable node or nodes. The scheduler is responsible for tracking resource utilization on each host (data source) to make sure that workloads are not scheduled in excess of the available resources. The scheduler must know the total resources available on each server, as well as the resources allocated to existing workloads assigned on each server.

In Kubernetes, servers that perform work are known as nodes 304. Node servers have a few requirements that are necessary to communicate with the control plane components 302, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed.

The main contact point for each node with the cluster group is through a small service called kubelet. This service is responsible for relaying information to and from the control plane services, as well as interacting with the etcd store to read configuration details or write new values. The kubelet service communicates with the control plane components to receive commands and work. Work is received in the form of a "manifest" which defines the workload and the operating parameters. The kubelet process then assumes responsibility for maintaining the state of the work on the node server. To allow individual host subnetting and make services available to external parties, a small proxy service is run on each node server. The proxy forwards requests to the correct containers, performs load balancing, and other functions.

While containers are used to deploy applications, the workloads that define each type of work are specific to Kubernetes. Different types of 'work' can be assigned. Containers themselves are not assigned to hosts. Instead, closely related containers (that should be controlled as a single 'application') are grouped together in a pod. This association leads all of the involved containers to be scheduled on the same host. They are managed as a unit and they share an environment so that they can share volumes and IP space, and can be deployed and scaled as a single application. Pods can be thought of as a single virtual computer and is the basic building block of Kubernetes and comprises one or more containers and share storage resources, and network resources. Pods run in a shared context and share the same IP using different port for containers.

With respect to data replication, a more complex version of a pod is a replicated pod. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers.

In Kubernetes, source material is often expressed as a parameterized template. A tool processes the template by executing any embedded scripting and replaces parameters with desired values to generate a particular configuration. Different sets of values using the same template allow for convenient reuse of containers. One way to handle templates is with Helm, which is the package manager for Kubernetes, which includes templating capabilities and works at the application level to allow multiple manifests to be deployed together.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. Replication controllers give all of the containers spawned from their templates the same label. This makes it easy for the controller to monitor each instance. The controller or the administrator can manage all of the instances as a group, regardless of how many containers have been spawned.

Labels are given as key-value pairs. Each unit can have more than one label, but each unit can only have one entry for each key. Pods can be given a name key as a general purpose identifier, or they can be classified by various criteria such as development stage, public accessibility, application version, etc. In many cases, many labels can be assigned for fine-grained control. A user can then select based on a single or combined label requirements.

Data protection in large-scale database processing systems involves backing up large amounts of data at regular time intervals. A simple backup using a database dump operation (e.g., mysqldump), which is a logical export of the database system, sends output files as streams to a backup storage device, such as a Data Domain Appliance, or similar. This approach provides a single solution for all types of Kubernetes Persistent VolumeClaim (PVC) systems, and the same implementation is provided for all databases, and application consistency is provided by the database dump operation.

In an embodiment, the container management system comprises a Kubernetes system, though all embodiments are not so limited. Other container management systems similar to Kubernetes may also be used, and specific reference to Kubernetes is meant to be primarily for example or illustration of possible embodiments.

Smart Container Prioritization

As stated in the Background, the ever-increasing amounts of data in large-scale data centers requires that critical data or data that needs to be backed up and restored in a higher order be given priority over the vast amounts of other data. In many cases, different containers can contain data that is of higher or lower priority than other containers. In this case, priority of processing should be set for the most critical containers first in case of emergency backup or restoration procedures in a data center. Current systems that only allow manual backups of priority data by system admins is often insufficient to ensure adequate data protection in present large-scale systems.

Embodiments of systems 100 and 200 of FIGS. 1 and 2 include a container priority component (120 or 210) to provide prioritization for the most critical containers in case of any necessary data recovery situation. Embodiments include a KNN-based machine learning solution that smartly predicts the criticality of a container based on multiple attributes. It implements a priority tagging-based backup in the data protection process. The model for the KNN process is trained with historical data of the containers from users and certain laboratory environments to ensure maximum accuracy in the prioritization of the backup object.

Using this model, the most critical container will be backed up first followed by subsequent containers as listed in a priority tagging list. The same prioritization may be applied to data restore operations, as well. This smart solution thus prioritizes backup order based on container criticality, and also allows for load balancing the user data protection system. The inclusion of supervised learning thus makes the container management process smarter and more efficient. The KNN-based intelligent solution ensures load balancing and appropriate allocation of the streams for the backup program.

For load balancing, in an embodiment, the system includes a monitor component that continuously monitors and dynamically adjusts the assignment of backup tasks to proxies. In this manner, the prioritization component provides a load balancing mechanism that optimizes resource utilization and enhances the overall performance of the system by ensuring intelligent and efficient utilization of all available proxies for backing up container objects. With the integration of a machine learning-based solution, not only are priority-based backups provided, but the system also maintains a well-balanced distribution of backup loads throughout the entire ecosystem. This constant monitoring and dynamic adjustment by the load balancing mechanism result in optimized resource utilization, thus maximizing the system's performance.

With respect to the KNN, process, KNN basically stands for k-nearest neighbors (KNN) algorithm, and is a classification algorithm that can be well used in case of classification and regression scenarios. KNN is a supervised learning algorithm that is dependent upon the labelled input data to study a function that would produce an output when a new unlabeled data is given as input. It classifies the data point on how its neighbor is classified. The basic principle of this model is to classify any new input data based on the similarity measure of the data points which was stored earlier.

For example, consider a dataset of fruits comprising coconuts and grapes. The KNN model will get trained with similar measures like shape, color, weight, etc. When some random fruit is processed, KNN will try to match its similarity with the color (red or yellow), weight and shape. A similar process can be used with the properties of data object that are used to tailor the KNN model to fit the container embodiment of FIG. 2. For example, if there are two Virtual Machines (Critical and Non-Critical) as labeled data, both would have a set of attributes like: size, number of CPUs, nature of applications, datastore size, provision type, vmdk size, etc. Any new VM introduced into the system can be predicted to be classified into a critical or non-critical based on these attributes. In this process, 'K' in KNN signifies the number of the nearest neighbors that would be leveraged to classify new data points (e.g., new Virtual Machines/Docker/any data object).

Figure 4:
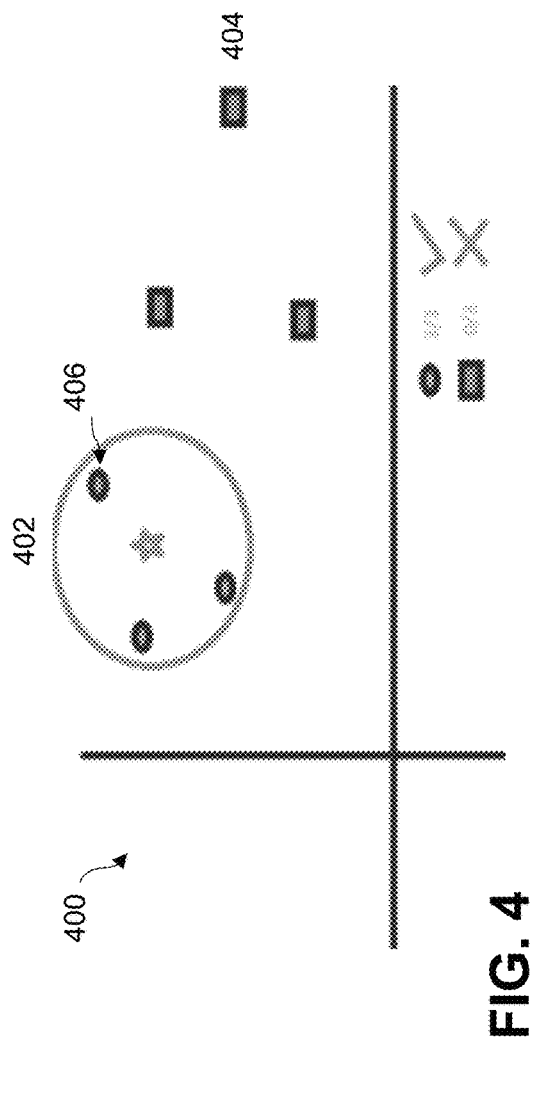
FIG. 4 illustrates an example depiction of a KNN implementation for a smart prioritization balancer for containers, under some embodiments.

FIG. 4 illustrates a simple example depiction of a KNN implementation that can be used for a smart load balancer for containers, under some embodiments. Plot 400 of FIG. 4 shows that if a new input (star) is to be classified into a circle 406 or rectangle 404, then the KNN model would calculate the Euclidian distance between the "Star-Circle" and "Star-Rectangle" for three occurrences (K=3). Since the 3 Circles are closest to the new data (star), so the category of this can be classified as circle.

Figure 5:
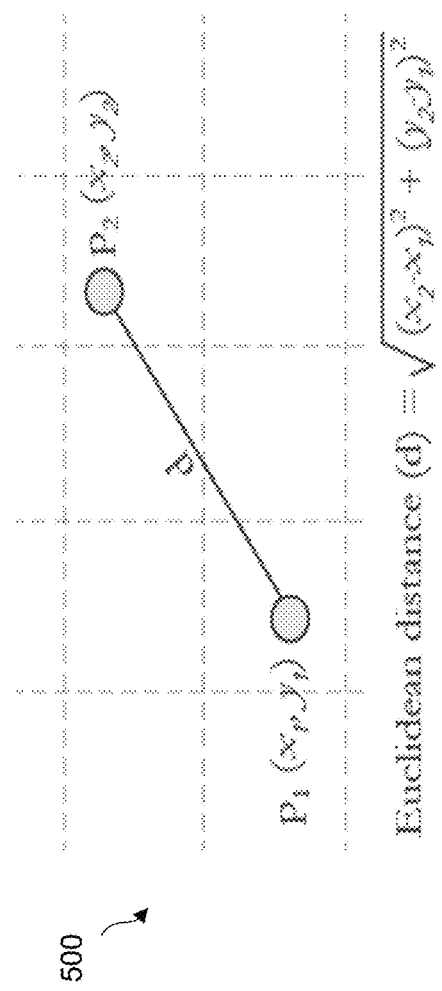
FIG. 5 illustrates a plot representation for the calculation of Euclidean distance for a KNN implementation, under some embodiments.

FIG. 5 illustrates a plot representation 500 for the calculation of Euclidean distance for a KNN implementation, under some embodiments. As shown in FIG. 5, the Euclidean distance (d) between points $P_1$ ($x_1$, $y_1$) and $P_2$ ($x_2$, $y_2$) is calculated by the following formula:

$$d = \text{SQRT}((x_2-x_1)^2+(y_2-y_1)^2)$$

For some embodiments of FIG. 1, the KNN model used in this solution leverages multiple parameters to decide the cumulative score of a container to finalize its priority tag. The model is trained with the container attributes from the historical data of container (Docker) daemons and also OS features. The process 120 uses few attributes from the Docker clients, hosts and the registries from the past where all the images are stored.

Figure 6:
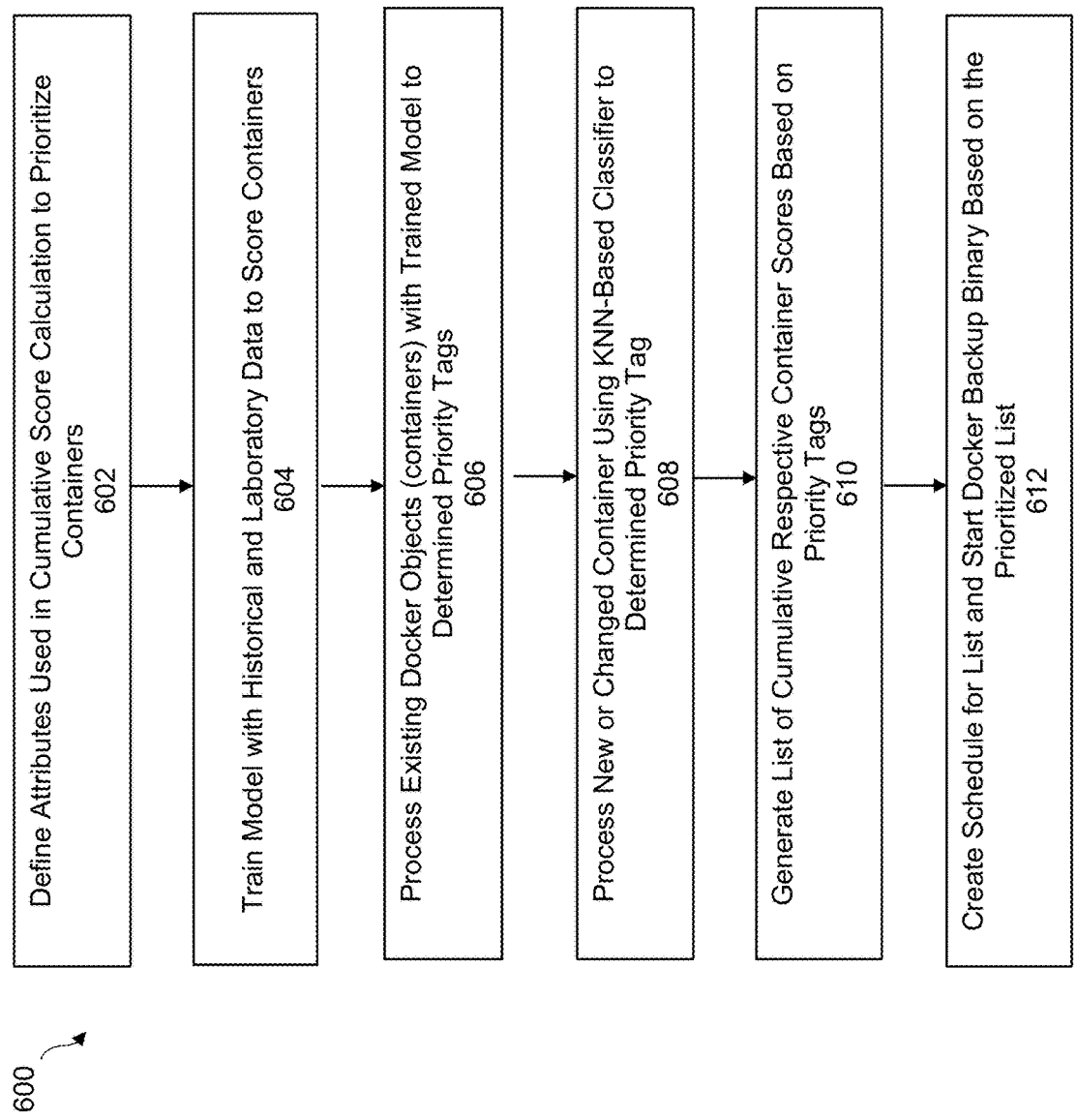
FIG. 6 is a flow diagram illustrating a method for prioritizing containers for data protection using supervised learning, under some embodiments.

FIG. 6 is a flow diagram illustrating a method for prioritizing containers for backups using supervised learning, under some embodiments. This supervised learning based container protection software ensures proper load balancing and covers the risk of missing out any critical container backup in disastrous scenario with maximum accuracy.

As used herein, "supervised learning" refers to a subcategory of machine learning (ML) and artificial intelligence (AI) that is defined by the use of labeled datasets to train algorithms that to classify data or predict outcomes accurately. In an embodiment, the KNN process is used for the data classification to classify current and new containers with respect to backup/restore prioritization within an overall data protection process.

The backup schedule for a group of known containers is generally defined by default prioritization rules and/or backup policies. As new containers are included in the backup process, the smart container prioritization process 210 automatically classifies and prioritizes the new container within the backup program.

In an embodiment, each container 202 has a number of attributes, such as size, number of CPUs, nature of applications, datastore size, provision type, vmdk size, and so on. One or more of these attributes can be used to determine a container's relative priority with respect to backup, restore, copy, or other data protection processes. For example, attributes such as data type, location, data recency, ownership, and so on, may be used to help define the prioritization of a container.

As shown in FIG. 6, process 600 starts in step 602 by defining the attributes that are used to determine priority of a container, and which may be used to define a score representing this priority. It should be noted that the attributes may comprise any appropriate operating parameter (e.g., size, applications, etc.), characteristic (location, ownership, etc.), label (high/low priority, etc.), or any other similar property describing or associated with the container.

To train a machine learning model for deciding the prioritization of container backups, the system is configured to consider several features (attributes) related to containers and their backup characteristics. Example features that are used to train the ML model are as follows:

1. Container Age: The age of the container since its creation or last modification. Older containers may be given lower priority for backup.
2. Container Importance: A measure of the container's criticality or importance to the overall system or business operations. Containers deemed more important can be assigned higher backup priority.
3. Resource Utilization: The resource usage patterns of the container, such as CPU, memory, and storage. Containers with higher resource utilization might be prioritized to ensure their backup is promptly available.
4. Network Traffic: The container's network activity, including inbound and outbound data transfer rates. Containers with higher network traffic may be considered more critical and given higher backup priority.
5. Container Dependencies: The dependencies of the container on other services, containers, or external resources. Containers that are relied upon by other components might be assigned higher priority to ensure system stability.
6. Frequency of Changes: The rate at which the container undergoes changes or updates. Containers that are frequently updated may be prioritized for backup to capture the latest changes.
7. Failure History: Historical data on container failures or incidents. Containers with a history of failures might be given higher priority to mitigate potential risks.
8. Data Sensitivity: The sensitivity of the data stored within the container. Containers with sensitive data may be assigned higher priority to ensure their backup is readily available for security and compliance reasons.
9. SLA Requirements: Service Level Agreement (SLA) requirements associated with the container. Containers with stricter SLA requirements could be prioritized accordingly to meet the agreed-upon backup and recovery objectives.
10. Backup Frequency: The frequency at which backups are scheduled for the container. Containers with less frequent backups may be prioritized to ensure adequate protection.

The above list is provided for example only, and embodiments are not so limited. Other or different attributes regarding containers and container priority, can be used.

As further shown in FIG. 6, the model for the KNN-based classifier is then trained using historical data, and laboratory data if appropriate, 604. This training generally involves analyzing historical data for the defined attributes and deriving priorities from that data.

Every container or Docker object in the system is then processed using the trained model to have assigned to it an appropriate priority tag, 606. In an embodiment, the priority tags are embodied as a numerical scalar value within a defined range. The numerical value represents the relative priority or hierarchy within the range. For example, a priority tag can be a Px tag along a range of P1 to P5 where P1 is highest priority and P5 is lowest priority. This range has five priorities, and any number of priority scores may be possible, such as binary high/low priority, or 1 to 10, and so on, depending on number of containers, system configuration, backup program constraints, and so on. The format and style of the tags may also be different, depending on system configuration. A common format would indicate priority tag 'P' and priority score 'x' as in Px, but other formats are also possible.

In the case of relatively few containers, each container may be assigned its own priority tag, and therefore, the containers will be backed up in a strict order. In general, however, the number of priority scores may be much less than the number of containers to be backed up, thus resulting in many containers sharing the same priority level. In this case, multiple containers having the same priority tag may be backed up within that priority level in a random order or in an order determined by a tie-break process. In an embodiment, in the case of multiple containers with same priority tag, each backup will assigned with equal number of available streams and the resources so that each of these backups run in parallel with maximum performance.

Any new container introduced into the system can be assigned with an appropriate priority tag using the KNN-based classifier based on its attributes, 608. This step of processing a new container can occur within any appropriate step of process 600 depending on when a new container is presented to the system.

The process then generates a list of cumulative respective container scores based on the priority tags, 610. In an embodiment, the prioritization component assigns a priority tag to each container. This tag is then utilized to calculate the cumulative score for each container. These cumulative scores assist in determining the prioritized list of container backup objects that will be provided to the scheduler component for backup execution.

A scheduler component can then create a schedule and the system can start the Docker backup binary to back up the container data based on and in the container order of the prioritized list, 612. At this stage, the system has the prioritized list of containers prepared for backup, and the data protection scheduler initiates the execution to schedule jobs based on priority. The scheduler assigns the most recent backup window to the containers with the highest priority, followed by those with lower priority.

Figure 7:
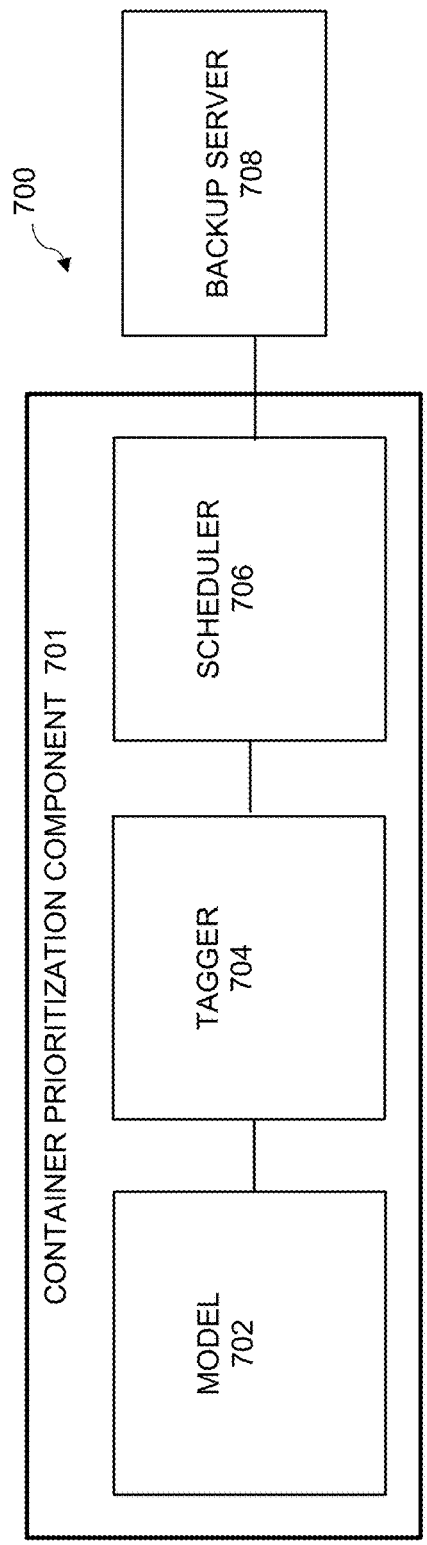
FIG. 7 illustrates components of a container prioritization component, under some embodiments.

FIG. 7 illustrates components of a container prioritization component, under some embodiments. System 700 of FIG. 7 includes a model 702 for the KNN-based classifier that is trained with historical data regarding container attributes to determined priority scores.

Once a container is classified, the respective priority score is tagged on the container workload by tagger 704, as a so-called 'priority tag'. Generally, the tagger assigns the priority score as a numerical ranking, such as between 1 to 10, or any other value depending on the range of scoring. Alternatively, a qualitative textual ranking may be used instead of a numerical ranking, such as along a "High-Medium-Low" scale or color scale ("Blue-Green-Yellow-Orange-Red), or any similar relative ranking scale.

In an embodiment, the tagger 704 appends the priority score as metadata to the existing JSON (JavaScript Object Notation) payload of the host or data source information. For this embodiment, the JSON payload of the host includes a KEY named "PRIORITY_TAG" (or similar) which would have the value of rank from (e.g., from 1-10). This weightage indicates the priority measure for that host at that instant of time. In general, the format can be changed to tag the same to JSON, or CSV, or onto the Kubernetes payload using the Kubernetes API's. The metadata of the backup would have this information since the payload of the backed up data would also be present in the metadata. For example, if the priority score is ranked at 3, then the JSON would have metadata including: { . . . , "PRIORITY_TAG": 3 . . . }.

In an embodiment, the priority score can be added as payload information to the Kubernetes host payload that is being generated at the data protection software side, and is generally not part of the native Kubernetes code.

Besides this metadata approach, other mechanisms to append the calculated priority score of an event to a container payload may also be used.

In an embodiment, the priority tags are processed by a scheduler 706 to be utilized by the backup (e.g., PPDM) server (or any other server) 708 to perform backup (and/or restore) operations of each container in the relative order set by the prioritized list generated by the scheduler 706. The scheduled backups are then performed in accordance with individual backup policies defined by the server 708.

As new containers are presented for backup, they are automatically classified and tagged with a priority tag for backup relative to the other containers. In this manner, the priorities of the containers to be protected can be dynamically altered to make sure that the highest priority containers are protected first regardless of age within the system. In the case of identical priorities, a tie-breaker rule for ambiguous cases can be defined based on a configured policy. For example, such a rule could consider the number of protection points already existing on the asset from the policy and number of times, whether or not the policy level priority was downgraded if anytime, and so on. The backups would then be triggered for the most satisfying cases. In the process of this execution, preliminary execution cycles would take place in parallel for the assets in consideration until the final priority decision is made.

In an embodiment, the container prioritization component 701 utilizes certain artificial intelligence (AI) and machine learning (ML) processes to evaluate different containers of the Kubernetes workload based on various attributes to generate the model 702 and evaluate containers for classification. Such a process generally uses a training component that continuously trains a machine learning algorithm.

Figure 8:
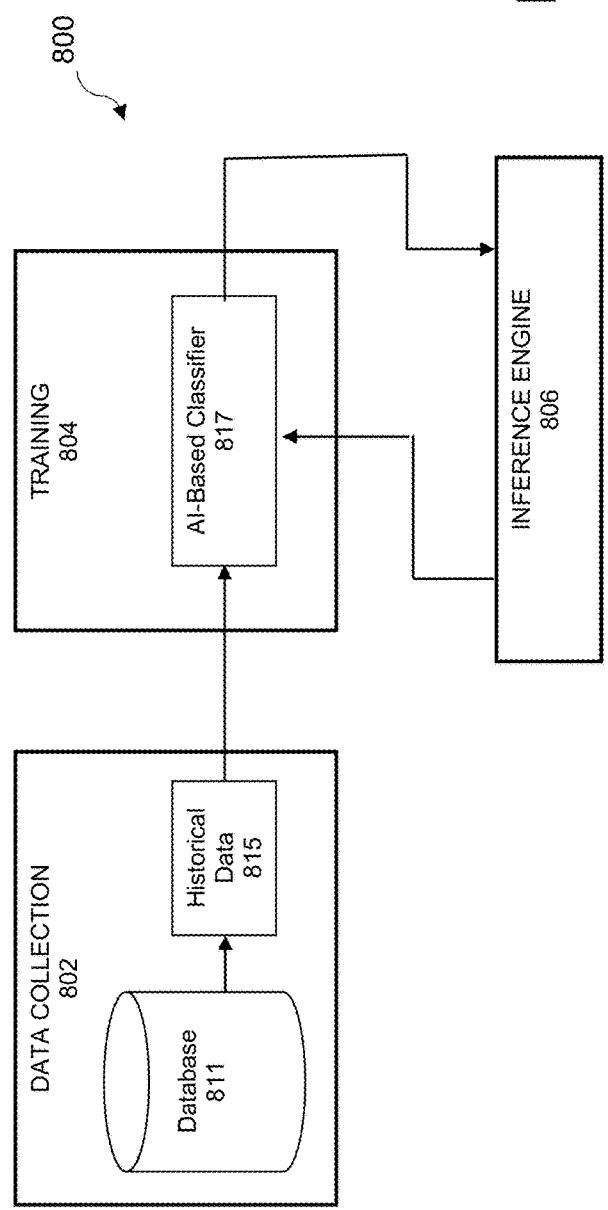
FIG. 8 illustrates a general AI/ML component used in a container prioritization component, under some embodiments.

FIG. 8 illustrates a general AI/ML component used in a container prioritization component, under some embodiments. System 800 of FIG. 8 includes a data collection component 802, a training component 804, and an inference component 806. The data collection component 802 can comprise various data loggers and I/O capture devices and databases 811 along with a body of historical information 815 about past containers and events (e.g., backups). The data collection component 802 continuously monitors and collects container and event data to build up its database. This collected information is submitted to the training component 804 through an AI-based analyzer 817. This component continuously trains a machine learning algorithm to identify the container attributes to thereby determine a relative backup priority of a container. The inference engine 806 also continuously trains the AI/ML algorithms through monitored events.

The AI component of system 800 may employ any suitable AI algorithm, such as KNN or RNN, or similar algorithm. In general, the performance required to handle the vast variation of data source types and huge size of the big data involved, which may be in zeta bytes of range, may be achieved with low latency and high throughput through embodiments described herein. Furthermore, through these AI processes, the decisions to tag the container workload as high or low priority is done in real-time. Such AI mechanisms may be scaled and modified for different application needs and system configurations.

Figure 9:
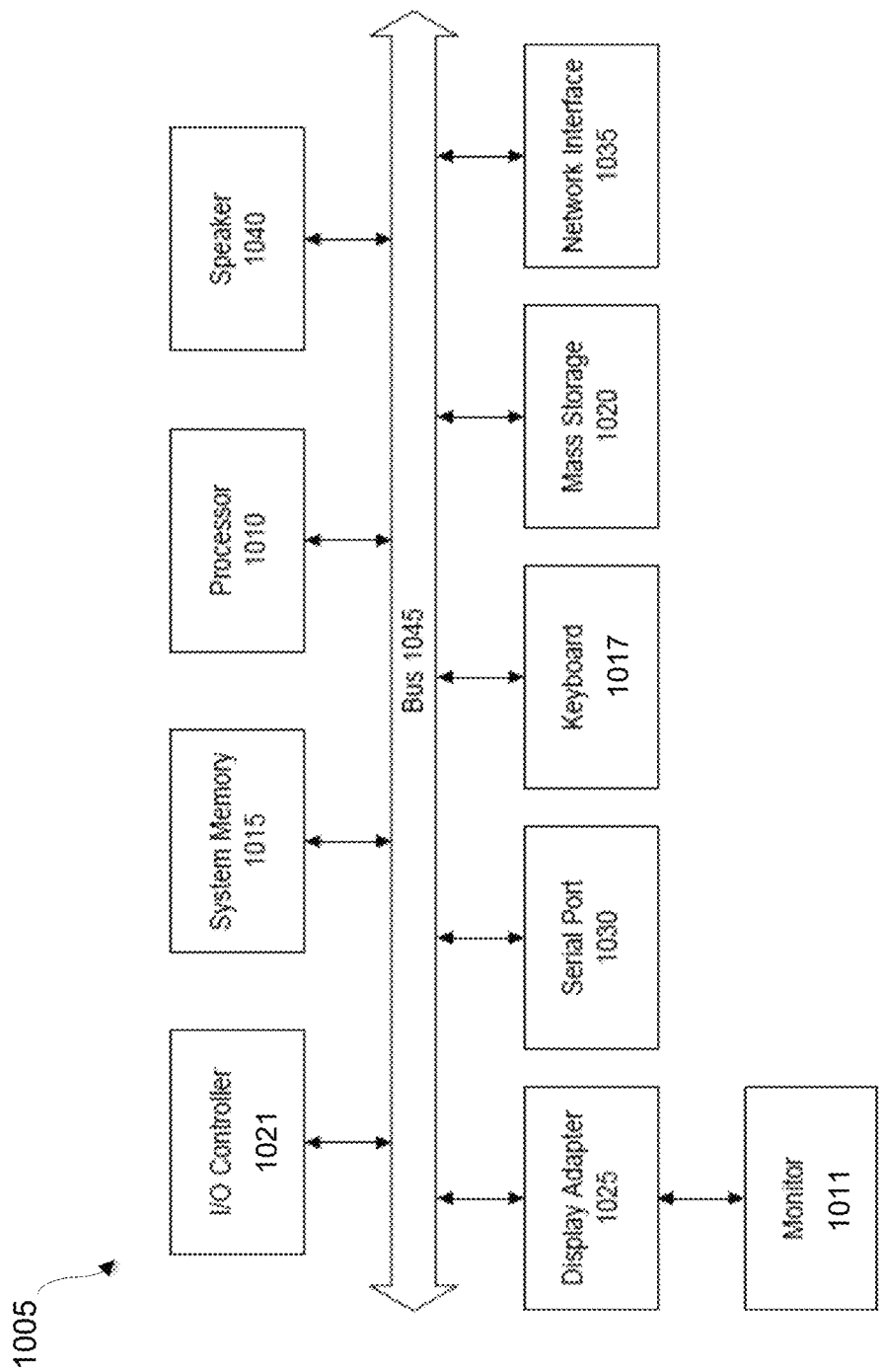
FIG. 9 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network or container system may comprise a computing device capable of executing software code to perform the processing steps described herein. FIG. 9 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of prioritizing backups of container data for a data protection program in an enterprise-scale Kubernetes cluster network, comprising:
   deploying a plurality of containers wherein each container is a portable, self-sufficient data structure encapsulating at least one application and operating environment;
   implementing a Docker container format and container management layer to automate the deploying step;
   defining attributes of each container of the plurality of containers storing the container data, the attributes comprising container size, ownership, creation time, location, applications, datastore size, and provision type;
   training a machine learning (ML) model to determine a backup priority of the plurality of containers based on operating parameters, characteristics, and labels of the attributes;
   classifying, with respect to the backup priority, each container of the plurality of containers storing the container data, and based on the defined attributes of each container;
   generating a priority score for each container based on the classifying;
   tagging each container with a priority tag based on the generated priority score, wherein the priority tag is added as payload information to a Kubernetes host payload generated by the data protection program; and
   backing up, by the data protection program, the container data in a backup order of the plurality of containers as determined by the priority tag of each container.

2. The method of claim 1 wherein the network comprises a controller, and an application program interface (API) server.

3. The method of claim 1 further comprising:
   automatically classifying newly deployed containers based on their respective attributes; and
   applying, in a case of identical priorities of two or more containers, a tie-breaker rule using a defined policy based on one or more data protection points.

4. The method of claim 1 wherein the priority tag comprises metadata appended to a dataset of the container data, and wherein the tag is implemented as an alphanumeric string appended to an existing payload of the dataset having data source information.

5. The method of claim 4 wherein the tag comprises a key value having a format of "PRIORITY_TAG" with an associated scalar value, wherein the associated value represents a priority value of a corresponding container ranked along a defined scale, and wherein the defined scale is on the order of 1 to 5, in one of ascending or descending order of priority.

6. The method of claim 5 wherein the tag is associated with the Kubernetes host payload using a Kubernetes application programming interface (API).

7. The method of claim 1 wherein the classifying comprises a k-nearest neighbors (KNN) algorithm that determines the backup priority based on the attributes.

8. The method of claim 7 further comprising training a model for the KNN algorithm using historical data of containers from users to establish past priorities of backups of the container data.

9. The method of claim 8 wherein the classifying utilizes an artificial intelligence (AI) based component comprising a data collection component, a training component, and an inference component, and contains historical information regarding containers of the network to continuously train an ML algorithm to identify backup prioritization of the container data.

10. The method of claim 9 wherein the network comprises a PowerProtect Data Domain deduplication backup system.

11. The method of claim 1 wherein the operating parameters and characteristics comprise container size, applications, relative container data importance, resource utilization, network traffic, container dependencies, rate of container data change, failure history, container data sensitivity, service level agreement requirements, and backup frequency, and wherein the labels comprise a characterization of a priority as high or low priority.

12. A system for dynamically prioritizing backups for a data protection program of datasets in an enterprise-scale Kubernetes cluster network, the system comprising a hardware processor and further comprising:
a plurality of containers deployed in the cluster network, wherein each container is a portable, self-sufficient data structure encapsulating at least one application and operating environment, and utilizes a Docker container format and container management layer to automate container deployment;
a component defining attributes of each container of the plurality of containers storing the container data, the attributes comprising container size, ownership, creation time, location, applications, datastore size, and provision type;
a machine learning (ML) model execution component trained to determine a backup priority of the plurality of containers based on operating parameters, characteristics, and labels of the attributes;
a classifier component of a hardware processor, classifying each container of the plurality of containers storing the container data with respect to the backup priority, and based on attributes of each container;
a processor-based component generating a priority score for each container based on the classifying;
a tagger component of the hardware processor, tagging each container with a priority tag based on the generated priority score, wherein the priority tag is added as payload information to a Kubernetes host payload generated by the data protection program; and
a physical backup server backing up the container data in a backup order of the plurality of containers as determined by the priority tag of each container.

13. The system of claim 12 further comprising a controller, and an application program interface (API) server.

14. The system of claim 13 wherein the priority tag comprises metadata appended to a dataset of the container data, and wherein the tag is implemented as an alphanumeric string appended to an existing payload of the dataset having data source information, and further wherein the tag comprises a key value having a format of "PRIORITY_TAG" with an associated scalar value, wherein the associated value represents a priority value of a corresponding container ranked along a defined scale, and wherein the defined scale is on the order of 1 to 5, in one of ascending or descending order of priority.

15. The system of claim 14 wherein the tag is associated with the Kubernetes host payload using a Kubernetes application programming interface (API).

16. The system of claim 12 wherein the classifying comprises a k-nearest neighbors (KNN) algorithm that determines the backup priority based on the attributes.

17. The system of claim 16 further comprising a training component training a model for the KNN algorithm using historical data of containers from users to establish past priorities of backups of container data.

18. The system of claim 17 wherein the classifier comprises an artificial intelligence (AI) based component comprising a data collection component, a training component, and an inference component, and contains historical information regarding containers of the network to continuously train an ML algorithm to identify backup prioritization of container data.

19. The system of claim 12 wherein the operating parameters and characteristics comprise container size, applications, relative container data importance, resource utilization, network traffic, container dependencies, rate of container data change, failure history, container data sensitivity, service level agreement requirements, and backup frequency, and wherein the labels comprise a characterization of a priority as high or low priority.

20. A non-transitory computer readable storage medium having stored thereon program instructions that, when executed by a process, cause the processor to perform a method of prioritizing backups of container data for a data protection program in an enterprise-scale Kubernetes cluster network, comprising:
accessing a plurality of containers deployed in the network, wherein each container is a portable, self-sufficient data structure encapsulating at least one application and operating environment, and utilizes a Docker container format and container management layer to automate container deployment;
defining attributes of each container of the plurality of containers storing the container data, the attributes comprising container size, ownership, creation time, location, applications, datastore size, and provision type;
training a machine learning (ML) model to determine a backup priority of the plurality of containers based on operating parameters, characteristics, and labels of the attributes;
classifying, with respect to the backup priority, each container of the plurality of containers storing the container data, and based on the defined attributes of each container;
generating a priority score for each container based on the classifying;
tagging each container with a priority tag based on the generated priority score, wherein the priority tag is added as payload information to a Kubernetes host payload generated by the data protection program; and
backing up, by the data protection program, the container data in a backup order of the plurality of containers as determined by the priority tag of each container.

* * * * *